United States Patent
Selles (10) Patent No.: US 6,271,844 B1
(45) Date of Patent: Aug. 7, 2001

(54) PROTECTED APPLICATION LAUNCHERS WITH GRAPHICAL INTERFACE

(75) Inventor: Gérard Selles, Adainville (FR)

(73) Assignee: Bull S.A., Louveciennes (FR)

(*) Notice: Subject to any disclaimer, the term of this patent is extended or adjusted under 35 U.S.C. 154(b) by 0 days.

(21) Appl. No.: 08/975,655

(22) Filed: Nov. 21, 1997

Related U.S. Application Data (63) Continuation of application No. 08/886,477, filed on Jul. 1, 1997, now abandoned.

(30) Foreign Application Priority Data

Jul. 1, 1996 (FR) ................................................ 96 08161

(51) Int. Cl.[7] ............................................................... G06F 15/00
(52) U.S. Cl. ............................................. 345/356; 345/329
(58) Field of Search ..................................... 345/356, 357, 345/329, 326, 330–339, 340–349, 352, 353, 354, 355, 195–196; 707/10

(56) References Cited

U.S. PATENT DOCUMENTS

| | | | |
|---|---|---|---|
| 5,611,048 | * 3/1997 | Jacobs et al. | 395/200.09 |
| 5,689,638 | * 11/1997 | Sadovsky | 395/188.01 |
| 5,721,780 | * 2/1998 | Ensor et al. | 380/25 |
| 5,731,813 | * 3/1998 | O'Rourke et al. | 345/349 |
| 5,815,703 | * 9/1998 | Copeland et al. | 395/613 |
| 5,838,319 | * 11/1998 | Guzak et al. | 345/340 |
| 5,838,322 | * 11/1998 | Nakajima et al. | 345/348 |
| 5,844,553 | * 12/1998 | Hao et al. | 345/329 |
| 5,892,905 | * 4/1999 | Brandt et al. | 395/187.01 |

FOREIGN PATENT DOCUMENTS

| | | |
|---|---|---|
| 0398645 | 11/1990 | (EP) . |
| 0421409 | 4/1991 | (EP) . |
| 0456386 | 11/1991 | (EP) . |
| 0561509 | 9/1993 | (EP) . |

OTHER PUBLICATIONS

Proceedings of the Network Operations and Management Symposium (NOM, Kissimee, Feb. 14–17, 1994, vol. 2 of 3, Feb. 14, 1994, Institute of Electrical and Electronics Engineers, pp. 681–690, XP000452385 Salvador A C et al: "A Task–Based, Graphical User Interface for Network Management" *entire document*.

* cited by examiner

*Primary Examiner*—Steven Sax
(74) *Attorney, Agent, or Firm*—Miles & Stockbridge P.C.; Edward J. Kondracki (57) ABSTRACT

The invention relates to a protected application launcher (LAP) with a graphical interface (OGI) for a data processing platform (PL) on which a set of applications (A1 through An), can be run and which includes a protected application launching means (MLA) with a graphical interface, and a memory (MEMO) for storing application launch commands. The launcher is characterized in that it comprises privilege acquisition means (MODPRIV) specific to each application and operatively associated with the launching means for delegating to any user access rights which allow him to launch said application, the launching means comprises launch authorization means (AUTLANC) which only allow the launching of an application if the current user has valid access rights.

11 Claims, 9 Drawing Sheets

PROTECTED APPLICATION LAUNCHERS WITH GRAPHICAL INTERFACE

This application is a continuation of application Ser. No. 08/886,477, filed Jul. 1, 1997 now abandoned.

CROSS-REFERENCES TO RELATED APPLICATIONS

The subject matter of the instant application is related to U.S. application Ser. No. 08/595,002, filed Jan. 31, 1996, for "A Tool For Generating and Executing Graphical Interface Commands", in the name of SITBON, BASSIER, CHAMPEVAL and LEVILLAIN (corresponding to French application No. 95 01236, filed Feb. 2, 1995), and U.S. application Ser. No. 08/683,413, filed Jul. 19, 1996, for "Application Integration Architecture For A Data Processing Platform", in the name of SITBON, BAILLIF, BLOCHET and BASSIER (corresponding to French application No. 95 08851 filed Jul. 21, 1995). The aforenoted applications are assigned to the assignee of the instant application. The subject matter of said application Ser. Nos. 08/595,002 and 08/683,413 are hereby incorporated by reference.

BACKGROUND OF THE INVENTION

1. Field of the Invention

The present invention relates to a protected application launcher with a graphical interface for a data processing platform constituted by a network of machines on which runs a plurality of heterogeneous applications.

2. Description of Related Art

In actual current practice, the data processing platforms used are increasingly complex. They are composed of a plurality of machines of various types (from different manufacturers), of different sizes (small, medium and large-scale computers), having internal as well as external communication protocols of different natures, and connected to one another through a network.

These platforms are most often "production oriented systems". In this respect, they have the same function as the traditional "mainframes" from large computer manufacturers. This means that they must exert a high level of control over the requests for services from the client-user ("customer service requests").

When someone seeks to launch an application intended to run on a platform of this type, the following problems arise:

1) Is the user who wishes to launch the application authorized to do so?
2) In the case where a large number of applications are at his disposal, and as a function of the work he wishes to accomplish, he may encounter great difficulty in finding the application best suited to this task. For this reason, it is essential to be able to classify them easily by their activity domains (called "services" by one skilled in the art).
3) The storage of commands for the launching of applications by the user is an error source due to the relatively complex syntax of these commands.

In the case of platforms running on the UNIX operating system, there are essentially two modes for launching applications.

The first, called the line mode, solves the first problem without allowing delegation or authorization, that is, the possibility of giving a user having limited access rights permission to launch an application to which he does not normally have the right.

The second, called the graphic mode, solves the first problem in the same way as the line mode, and also solves the third problem.

SUMMARY OF THE INVENTION

It is precisely the object of the present invention to simultaneously solve all three problems noted above by providing a protected application launcher with a graphical interface which allows both access authorization and a tree classification specific to the user.

According to the invention, the protected application launcher with a graphical interface for a data processing platform comprising a plurality of machines connected in a network on which runs a set of heterogeneous applications, includes a protected application launching means with a graphical user interface, and means for storing application launch commands, and is characterized in that it comprises:

privilege acquisition means, specific to each application and associated with the launching means, for authorizing access rights to any user, allowing him to launch the chosen application, and launch authorization means which only allow the launching of an application if the corresponding user has valid access rights.

In a preferred embodiment of the invention, the application launcher also comprises means for classifying applications according to a tree structure determined by the user.

BRIEF DESCRIPTION OF THE DRAWINGS

Objects and advantages of the subject invention will become apparent from a study of the following specification when viewed in light of the accompanying drawings, in which.

DESCRIPTION OF THE PREFERRED EMBODIMENT(S)

Figure 1:
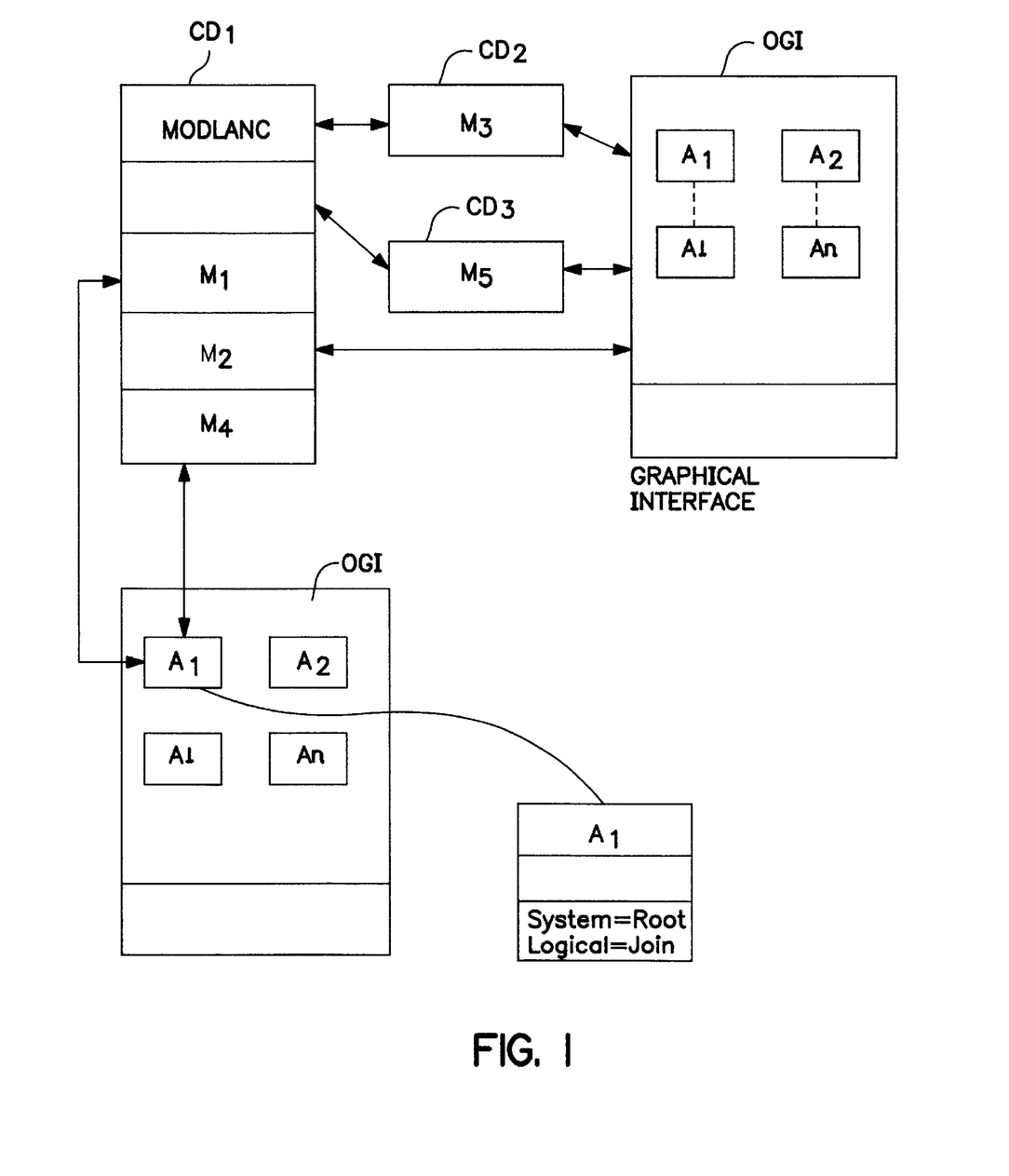
FIG. 1 shows a preferred embodiment of the main elements of the application launcher in accordance with the instant invention.
Figure 9:
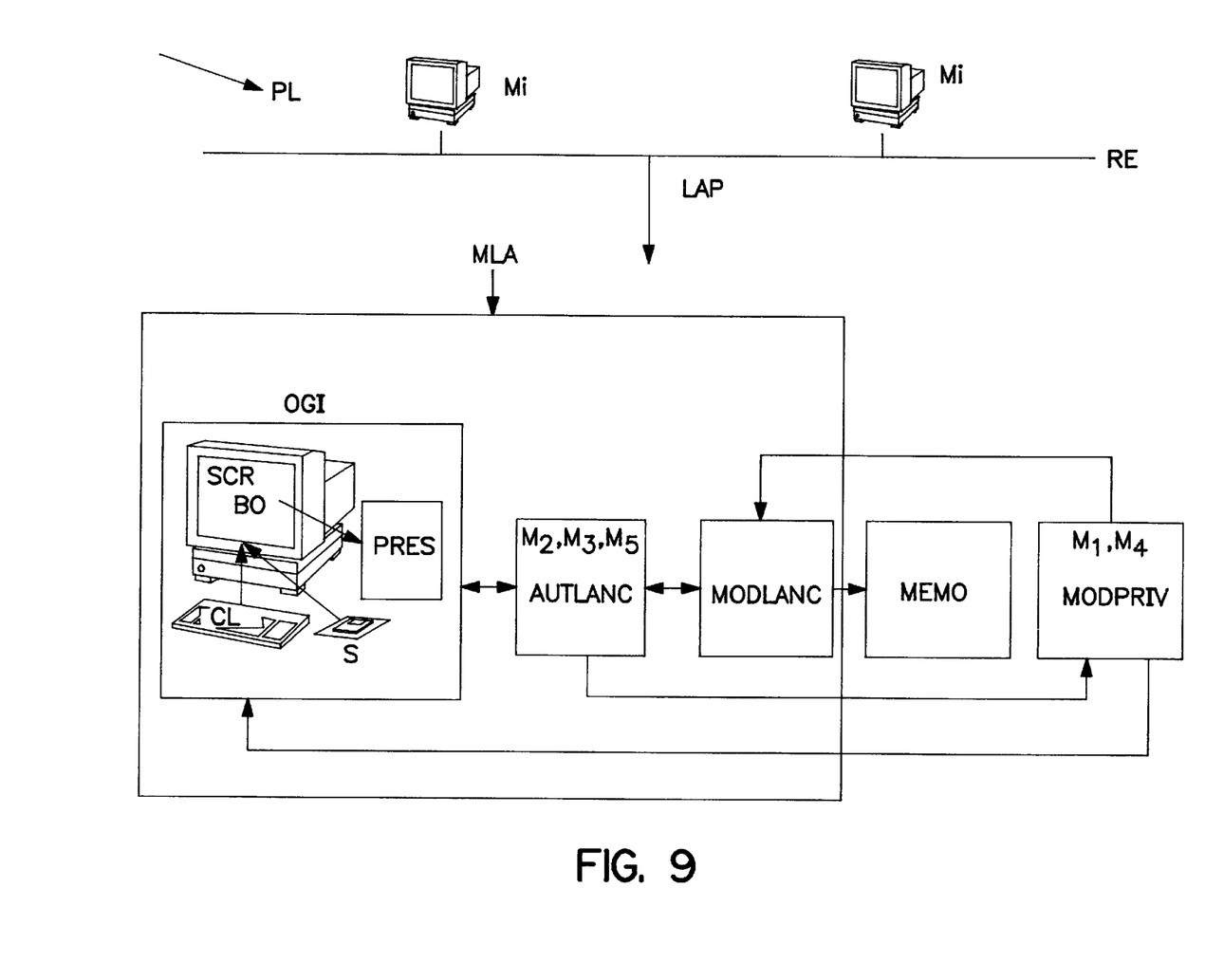
FIG. 9 shows, in block form, a preferred embodiment of the application launcher for a data processing platform in accordance with the instant invention.

With reference to the drawings, and more particularly FIGS. 1 and 9, the launcher LAP according to the invention belongs to a complex data processing platform PL which comprises machines Mi connected to one another through a network RE. The structure of such platforms is well known and is described, for example, in the aforenoted U.S. application Ser. No. 08/683,413, filed Jul. 14, 1996, and corresponding to French patent application No. 95 08851, filed on Jul. 21, 1995, under the title "Application Integration Architecture for a Data Processing Platform."

In the following text, the platform PL is assumed to be running on a UNIX (a registered trademark of Novell Inc.) type of operating system.

The launcher LAP can be considered to be a terminal of PL from which any user, for example a human user, can launch any application he wishes to run on any of the machines Mi.

The various elements which constitute the launcher LAP are:
- the application launching means MLA comprising the graphical interface OGI, launch authorization means AUTLANC, and an application launch module MODLANC,
- the means MEMO for storing the launch commands, and
- the privilege acquisition means MODPRIV.

The graphical interface OGI allows the user (the human operator, for example) to easily select any application from among a plurality, thanks to the "presentation" part of the application which establishes a clear two-way visual link between the image seen by the user on the screen SCR of the interface and the title of the application, which is itself assumed to be as representative as possible of the content of the application. Thus, the image perceived on the screen symbolizes the application and the user can easily interpret what this image means. This can be more clearly understood by referring to FIGS. 2 through 4 in particular, which are described in further detail after the description.

OGI includes a software program PRES for presenting applications. This software is connected by an appropriate link to a mouse S which makes it possible to cause external events. The mouse S is for example the type with three buttons. The external events caused by the mouse are processed by a pre-programmed mouse interface incorporated into the software PRES, which is also able to recognize the pressing or release of a button, the dragging of the mouse, and logical events such as the entry of the pointer into a window W or a field F represented on the screen. On the screen, the position of the pointer of the mouse is represented by a small arrow pointing upward. Of course, without going outside the scope of the invention, the mouse could be replaced by any other pointing device such as a light pen or a graphic plotter. Finally, in addition to the mouse interface, an interface is also provided for a programmed keyboard CL, for the character keys as well as for the command keys and the arrow keys, so that it is possible to enter, in the edit mode, the information which corresponds to different areas of different windows. The presentation software PRES allows the display of windows and the execution of actions selected on control buttons in a window as a result of the triggering of an external event such as the pressing of a mouse button, for example. In the text which follows, it is implied that any operation for launching applications will be effected by means of the mouse and/or the keyboard.

The display of the windows occurs by means of a graphical interface of the X/Motif type.

Techniques for using a mouse or a keyboard and, more generally, a graphical interface, are well known to one skilled in the art.

The graphical interface is adaptable and its control panel BO (the form in which the images appear on the screen) can be redefined as many times as desired, and it is possible to move from one control panel to another at any time, depending on the wishes and the needs of the user. The form of a determined control panel is called a configuration CONFIG.

By extension, the assembly formed by the display screen SCR, the software PRES, the mouse S, the keyboard CL and the control panel BO is generally referred to under the same generic term graphical interface OGI.

A set of applications corresponding to a determined utilization domain can be made to correspond to a given control panel. On the screen, the applications appear in the form of a quadrangular box inside which appears a drawing that is a metaphor representing the subject of the application, the title of the latter appearing beneath the drawing.

Examples of control panels with the names of corresponding applications appear in FIGS. 2 through 8 and will be described in detail below, in connection with a more precise analysis of the figures.

In some of the control panels, empty boxes appear: this allows the user to add or delete applications as desired in the corresponding domain of the associated control panel.

In a known way, any application is launched by means of specific launch commands which are stored in a memory MEMO disposed, for example, inside the terminal constituted by OGI. The launch commands are hidden from the current user and are known only to the administrator, and thus can only be modified by the latter. The administrator (who can only be human) is a person who is in charge of organizing and managing the platform PL. He is authorized to allocate to each of the end users, also called current users, the activity domains and the applications to which each of them has access.

These commands for launching an application are implemented by the launch module MODLANC which runs permanently at any location in the platform (in any machine Mi).

The essential requirement which must be met by the launcher according to the invention is security, which means that when it comes to launching, removing, adding, or modifying any application, a person can only do it, on condition that this person is duly authorized, that is, that he has received a delegation or authorization for this purpose.

This authorization is based on the following two essential characteristics:
1) the user of the UNIX operating system has the right to launch a command, and
2) a second determined user also receives a delegation to launch a command.

Figure 8:
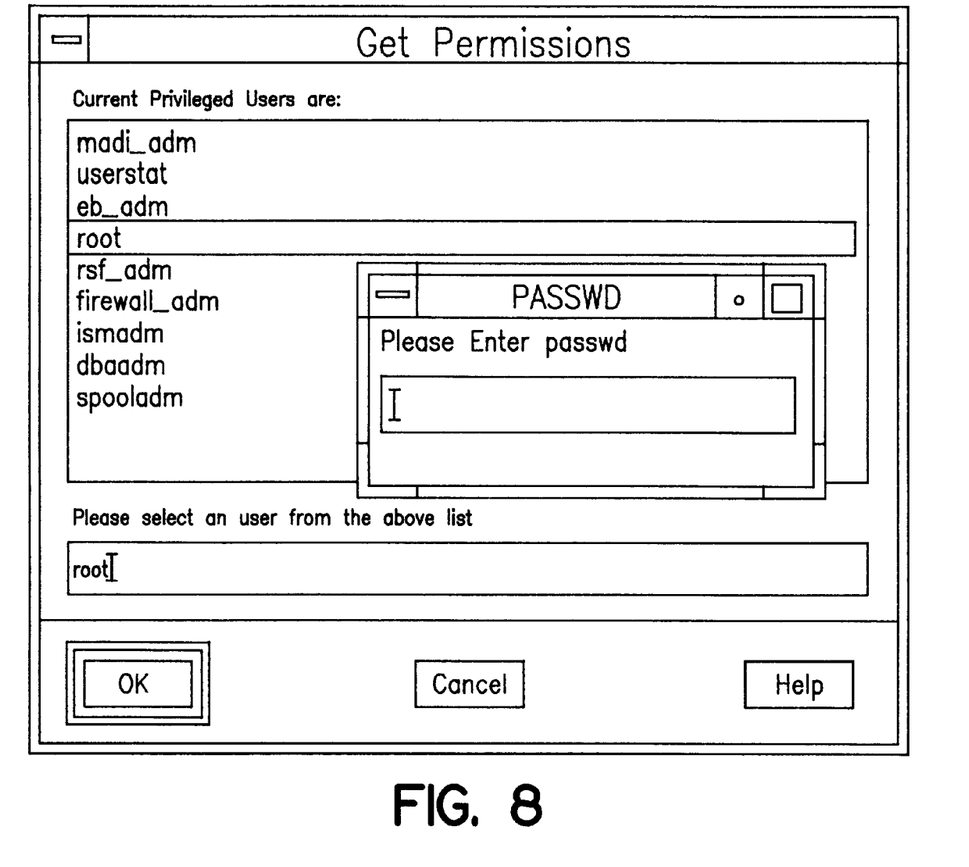

A password corresponds to each of these two characteristics, respectively, namely:
1) a "system" password which defines the name of the user required by the operating system, for example the word "root" which can be seen displayed on the screen reproduced in FIG. 8, which corresponds to a given privilege, such as the maximum privilege, such a word being entered by the administrator of the platform from OGI. Of all the users, it is he who has the maximum capability, or in other words, has the maximum privilege.
2) a so-called "Logical" password which defines a name of any user who has the right to launch a given application by identifying himself as a user of the system. He is said to have received a delegation authority to run the application.

It is these two passwords which define the delegation.

It is on the basis of these two essential characteristics, with which the two passwords are associated, that the means AUTLANC for authorizing the launching of an application operate.

Refer to FIG. 1.

The essential elements which constitute the means AUTLANC are the following:
- the access control module M2, the access acquisition module M3, the execution entry module M5.

The access control module M2 grants or denies permission to the current user (the one to whom the "Logical" password corresponds) to run an application.

The access acquisition module M3 allows the current user to remove a denial of execution which is impeding him, by prompting him to respond to a "Logical" password.

It is important to note that the launch module MODLANC keeps up to date the list of the permissions acquired by the various current users during the session in progress: these permissions are issued by a delegation definition module M1 whose role will be defined more precisely below. They are stored in any suitable memory in the system.

The mode in which the authorization to launch an application is executed is a function of the combination of the two passwords "Logical" and "system". This is explained by the following table:

| "System" password | "Logical" password | Password required | Comments |
|---|---|---|---|
| x | x | "Logical" | The "Logical" user is authorized to use this application. At the level of the operating system, this application may require rights greater than those allocated to the "Logical" user. |
| — | x | "Logical" | The "Logical" user is authorized to run this application alone, which does not require any right at the level of the operating system. |
| x | — | "System" | The current user can only run this application if he knows the "System" password. |
| — | — | None | Anyone can run this application. |

In reference to the preceding table, in cases 1 and 3, which appear on the first and third lines of the table, it is the execution entry module M5 which allows the current user to be presented to the operating system in place of the system user.

It is important to note that only the application launch module MODLANC is authorized to activate the module M5, an authentication protocol having been established between them.

Likewise, two authentication protocols are established between MODLANC and M2, one of which is outgoing, indicating that only MODLANC can activate M2, and the other of which is incoming, indicating that MODLANC has been informed as to whether M2 has succeeded or failed in its control.

Thus, it may be seen that the modules M2 and M5 can only be activated from the launch module MODLANC.

At any time, the administrator of the platform can revoke a delegation, which revocation takes effect at the next request to run the application immediately following the one which is in the process of running.

The modules M1 and M4 constitute the privilege acquisition means.

The module M1, called the delegation definition module, relates to the presentation of the various privileged users and to the start of the dialog which allows a user to acquire a delegation. For this purpose, the module M1 calls the module M2. This module corresponds to the function called "Get Permissions" which is explained below in connection with the description of FIGS. 7 and 8.

The module M4 relates to the partial or total revocation of the delegations acquired thanks to the modules M1 and M2, which respectively corresponds to the functions "Deny Permissions" and "Deny All Permissions", which are also explained below as part of the description of FIGS. 7 and 8.

Thus, as seen in FIG. 1, the modules MODLANC, M1, M2, M4 are united under the same code CD1, while the modules M3 and M5 respectively fall under the codes CD2 and CD3. The interactions between the module MODLANC and the modules M3 and M5 are represented by bidirectional arrows.

The interface OGI is symbolized by a rectangular screen on which the applications A1, A2, Ai, An appear in the form of rectangles. At the bottom of this same figure, bidirectional arrows symbolize the relationships between the modules M1 and M4, which have the effect of modifying the privileges of the user of the application A1, whose two "System" and "Logical" passwords are shown (at the bottom right of the figure).

For a better illustration of how the current user can work with the application launcher according to the invention in a user-friendly way, refer to FIGS. 2 through 8, which are briefly described below.

Figure 2:
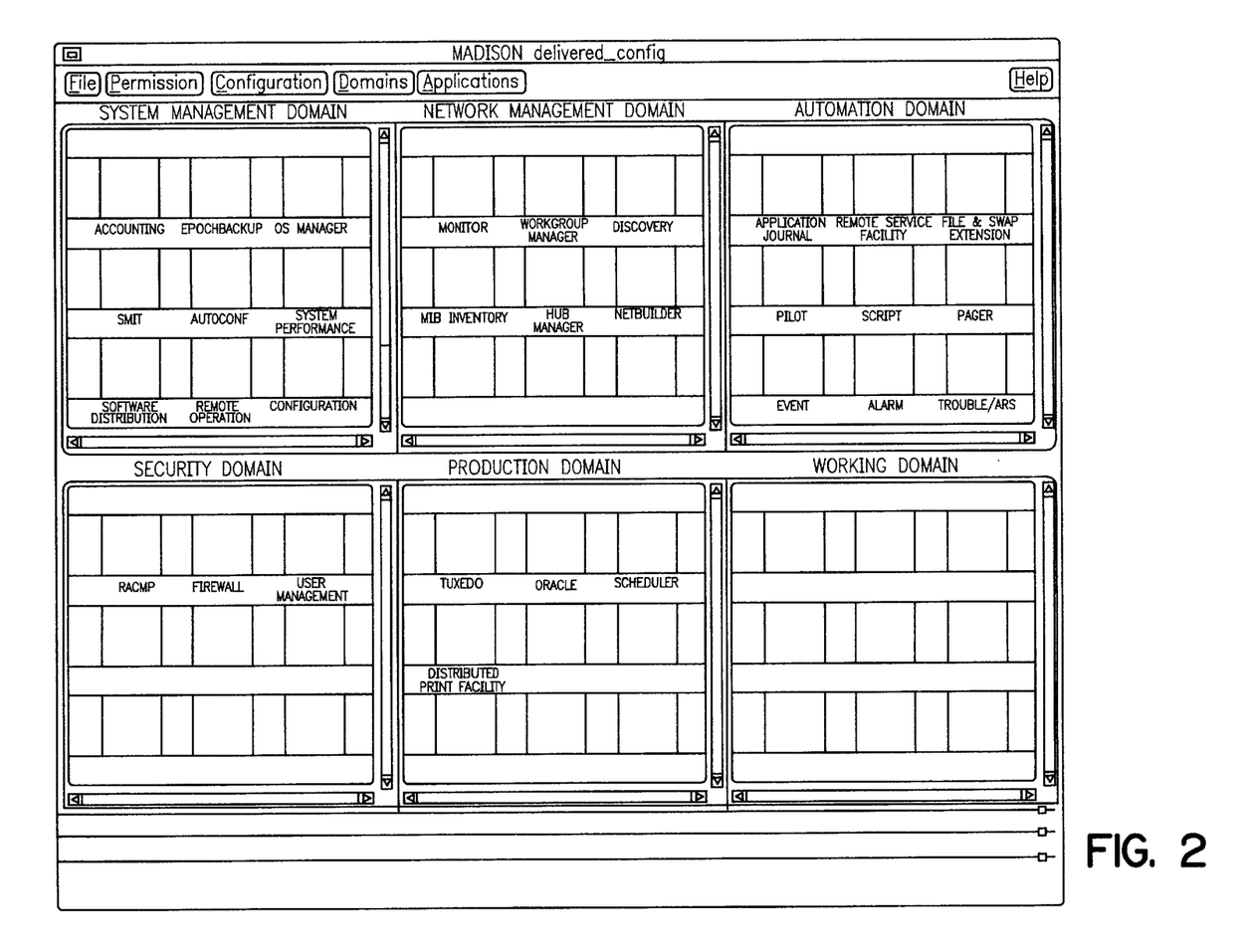
FIGS. 2–4 are exemplary screen displays which show how information is displayed to the user in the conventional mode.
Figure 3:
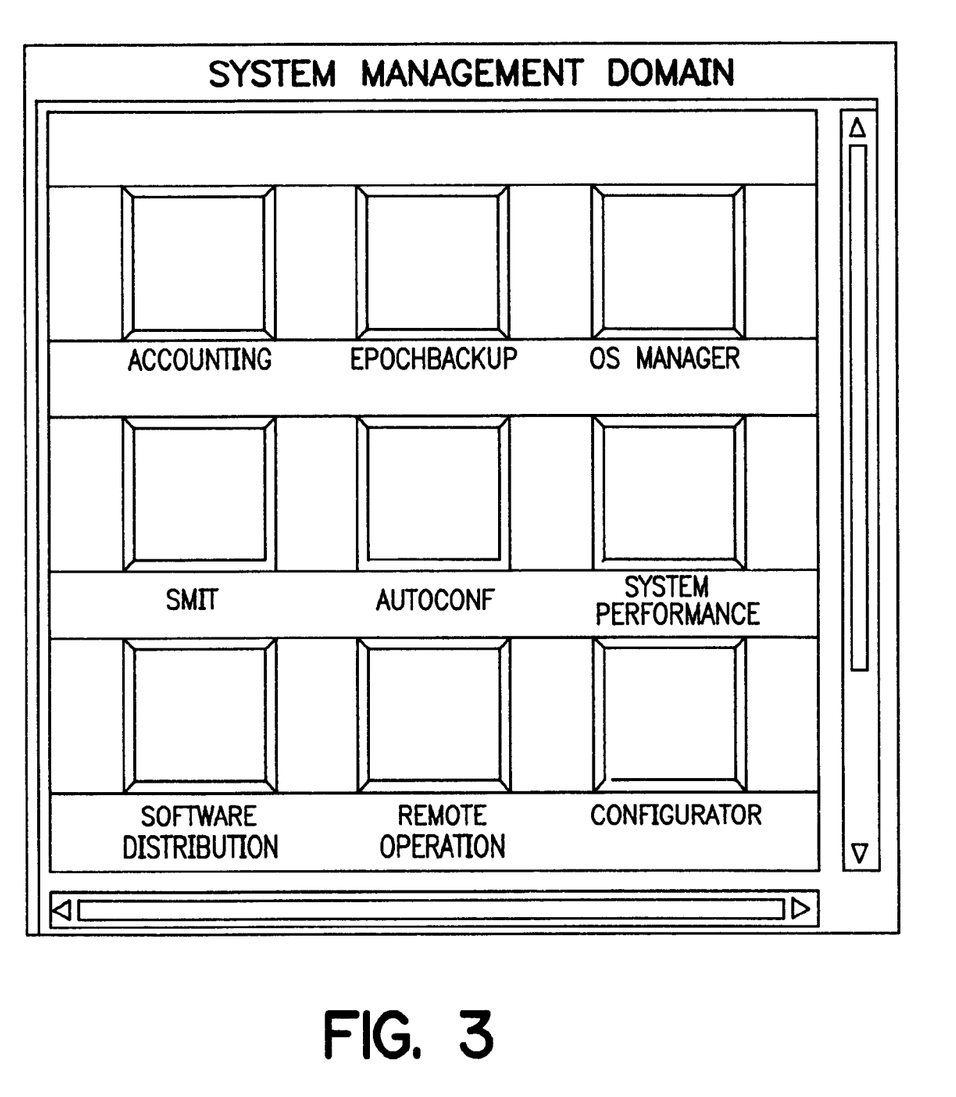
Figure 4:
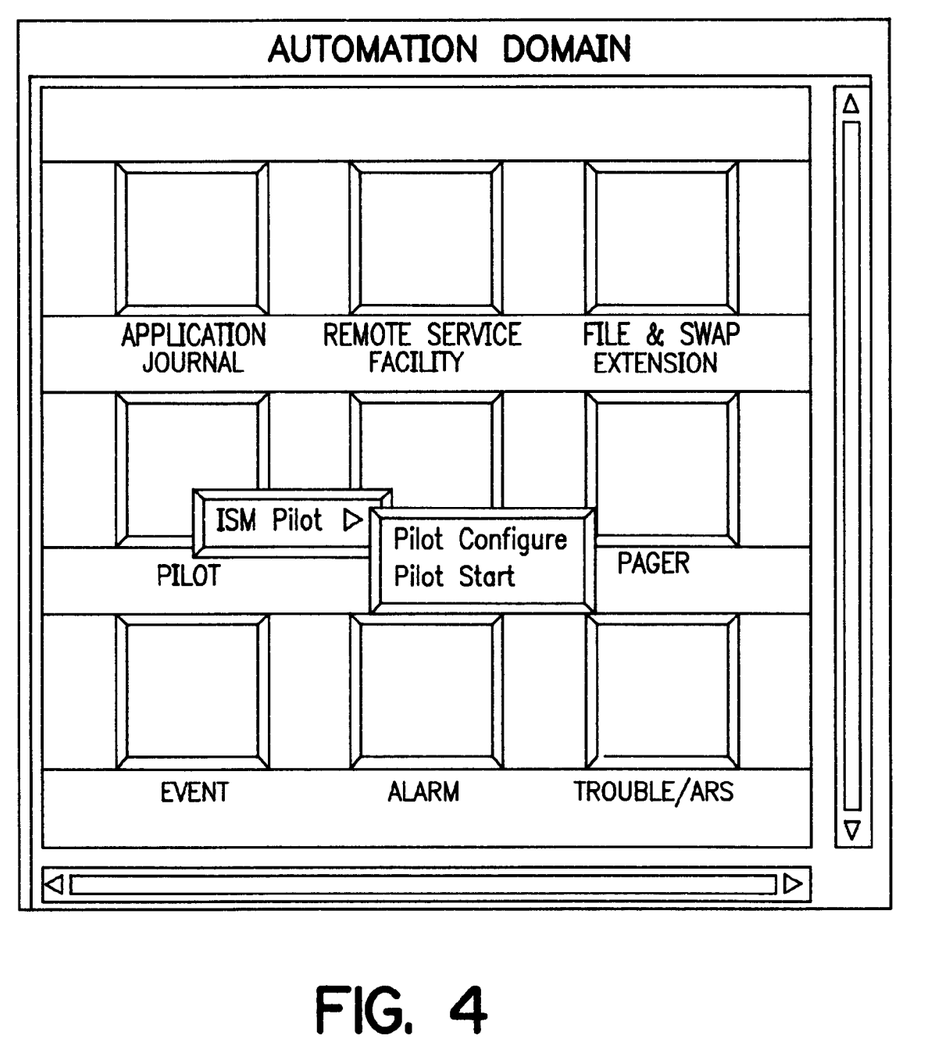

In order to use the graphical user interface OGI of the launcher LAP according to the invention to launch any application, there are two different working modes available to the administrator, and he can switch from one mode to the other as desired at any time:

a) a first, so-called conventional mode, which allows the user to navigate through a plurality of cascaded windows (FIGS. 2 through 4).

b) a second mode with a single window (FIG. 5) in which all the applications are represented in a single tree which makes it possible to access an application directly by clicking once on the mouse S.

In examining FIGS. 2 through 4, which show how the information appears on the screen SCR for the human user in the case where the latter has chosen the conventional mode, a menu bar can be seen at the top left of the screen, which contains a certain number of options, namely, from left to right:

File

Permission

Configuration

Domains=Domains of the applications

Applications=Applications within the same domain.

Beneath the menu bar, six application domains appear, each of which contains nine quadrangular boxes which are either empty or contain an icon which represents the nature of the application for the user in an obvious way.

As seen in FIG. 2, these various domains are the following:

System Management Domain

Network Management Domain

Automation Domain

Security Domain

Production Domain

Working Domain.

Thus, as seen in FIG. 2, the working domain includes only empty boxes: this domain is provided so that the user can integrate his own applications, but it must be perfectly clear that he can also integrate them into any other domain as desired. The System Management Domain comprises 9 full boxes which correspond to nine available applications, the Network Management Domain comprises six full boxes, and so on.

In referring to FIGS. 3 and 4, each of the domains "System Management Domain" and "Automation Domain", respectively, may be seen in greater detail. The first of these comprises nine applications, successively named "ACCOUNTING", "EPOCHBACKUP", "OS MANAGER", "SMIT", etc., and the second also comprises nine, namely "APPLICATION JOURNAL", "REMOTE SERVICE FACILITY", "FILE AND SWAP EXTENSION", "PILOT", etc.

Figure 5:
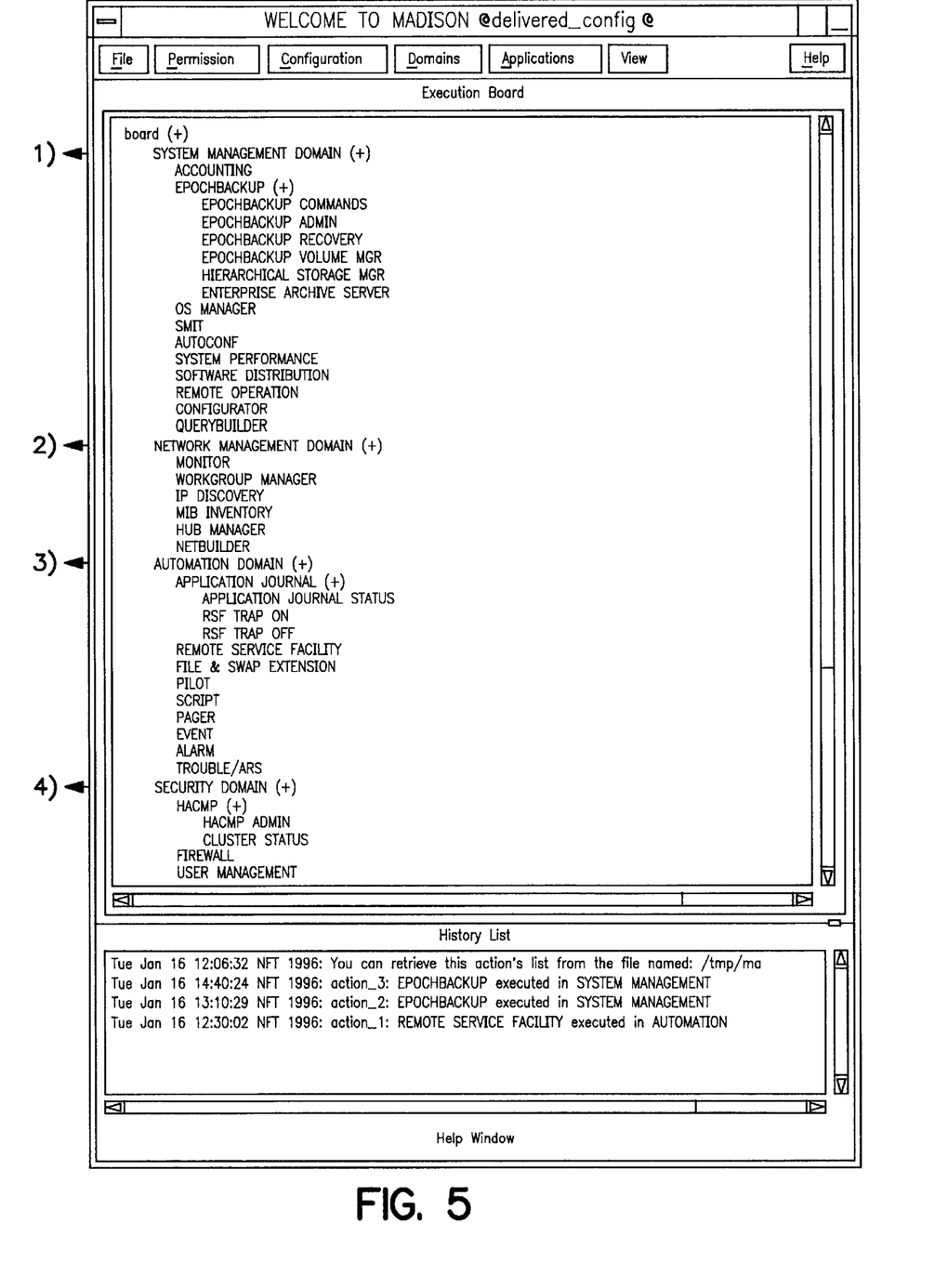
FIG. 5 shows an exemplary screen display for a second mode with a single tree.

In referring to FIG. 5, it is possible to see what appears on the screen when the user has chosen the second mode with the single tree.

The first four domains mentioned above, designated 1 through 4 in FIG. 5, appear in this figure and it is clear that for each of them, the names of the applications they contain correspond to each of the names that may be seen in FIGS. 2 through 4.

Figure 6:
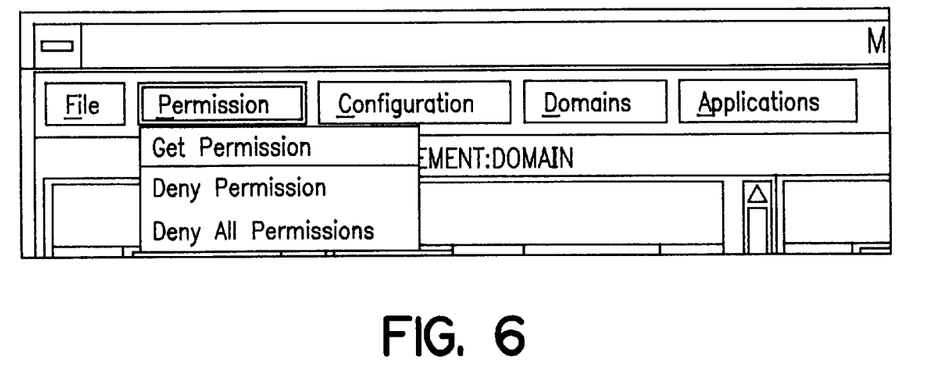
FIG. 6 shows an exemplary screen display presenting a permission menu.

Refer to FIG. 6. By clicking with the mouse S on the "PERMISSION" option on the menu bar appearing at the top of the screen, it is possible to display on the screen the so-called permission menu which includes, in succession, the options "Get Permission", "Deny Permission", "Deny All Permissions".

Figure 7:
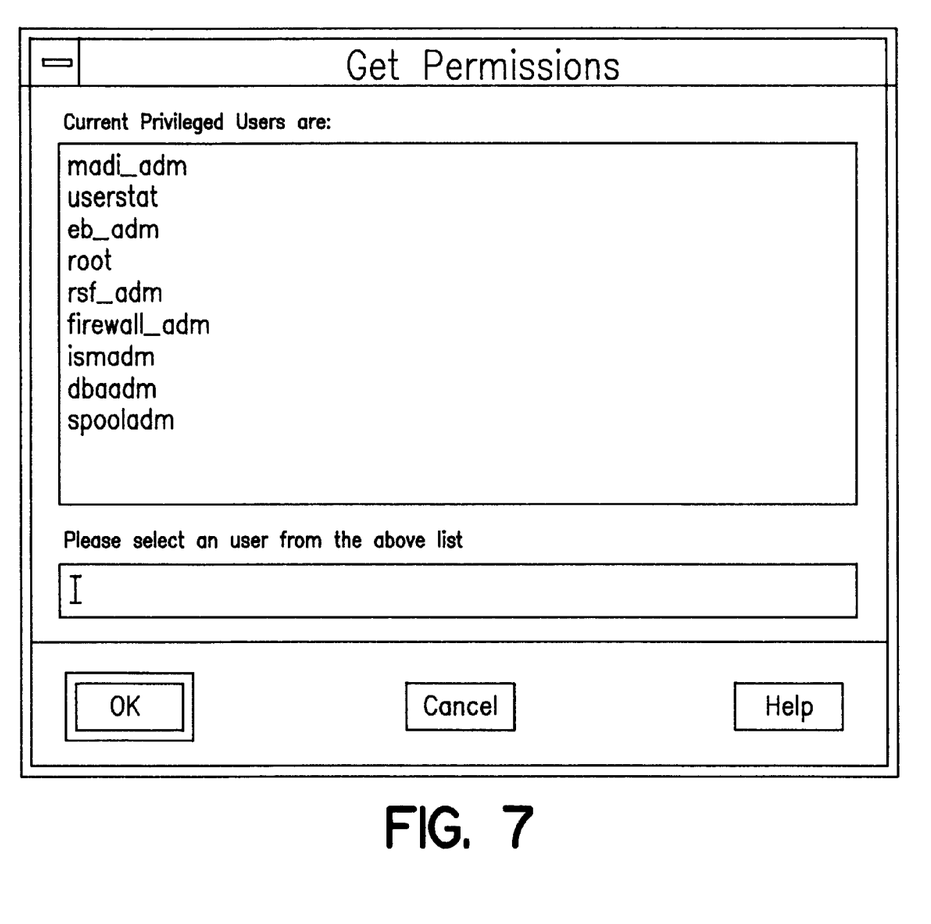
FIGS. 7 and 8 show exemplary screen displays for providing privileges to a user in accordance with the instant invention.

By clicking on the option "Get Permission", it is possible to display on SCR the information shown in FIG. 7. The user sees displayed at the top of the screen the names of the current privileged users (the nine names at the top of the screen, including "root", called the "current privileged users"). By clicking on the name of the chosen user, in this case "root", it is possible to display on SCR the information in FIG. 8, which reveals the need to enter a password inside the rectangle located in the middle of the screen, which includes the indication "PASSWD" located at the top of the rectangle, and the instruction "please enter password".

As soon as the password is entered by the user and the combination of the two pass words is validated, the user can launch the application.

The user can, as desired, either select the application he intends to run first, and then acquire the delegation, or do the opposite if he has sufficient knowledge of the applications he can run and the passwords related to each of them, which in this case he knows in advance.

In summary, and as can be seen most clearly in FIG. 9, when a user wants to launch an application, the user uses the mouse S or the keyboard CL to send a request to the AUTLANC module. If the user is authorized to launch any application, then the AUTLANC module acts directly on the MODLANC module which launches the application by activating the launching commands contained in the memory MEMO. On the other hand, if the user needs to acquire privileges to launch the application, module AUTLANC calls module MODPRIV to determine if the user has the privileges required for the application. If the user satisfies the request from module MODPRIV, MODPRIV calls MODLANC which launches the application by activating the launching commands contained in the memory MEMO. If the user does not satisfy the request from module MODPRIV, then the application cannot be launched and there is a return to graphical interface OGI.

While a preferred embodiment of the invention has been illustrated and described, it will be apparent to those of ordinary skill in the art that various changes and modifications may be made without deviating from the inventive concept and spirit of the invention as set forth above, and it is intended by the appended claims to define all forms of the invention which come within the full scope and true spirit of the invention.

What is claimed is:

1. A protected application launcher (LAP) with a graphical interface (OGI) for a data processing platform (PL) including a plurality of machines (Mi) connected in a network (RE) on which runs a set of heterogeneous applications (A1 through An) and having a determined operating system, which includes protected application launching means (MLA) with a graphical interface (OGI), and means for storing (MEMO) application launch commands, the improvement comprising:

privilege acquisition means (MODPRIV), specific to each application and operatively associated with the launching means for delegating to a user access rights which allow the user to launch a protected application, launching means (MLA) launching said protected application, and launch authorization means (AUTLANC) for allowing the launching of the protected application only when a delegated user has valid access rights.

2. The protected application launcher according to claim 1, wherein the launch authorization means authorizes launch of said application as a function of the combination of first and second passwords, the first password being a "system" password and the second password being a "Logical" password, the "system" password defining the name of a user required by said operating system of the platform (PL), the "Logical" password defining a name of a user who has a right to launch a given application when a current user presents himself as a user of the platform.

3. The protected application launcher as set forth in claim 2, wherein the launch authorization means (AUTLANC) comprises:

an access control module (M2), an access acquisition module (M3), and an execution entry module (M5), which operatively function to allow the launching of an application only when the current user has authorized access by the combination of passwords.

4. The protected application launcher as set forth in claim 3, wherein the access control module (M2) operatively function to grant or deny permission to the current user to run an application, and the access acquisition module (M3) allows the current user an opportunity to remove a denial of access by prompting him to respond to identify a "Logical" password.

5. The protected application launcher as set forth in claim 4, wherein the execution module (M5) allows the current user to be presented to the operating system for authorized access in place of the system user.

6. The protected application launcher according to claims 1, characterized in that the privilege acquisition means (MODPRIV) comprises:

a delegation definition module (M1) for the presentation of various privileged users and for initiation of a dialog which allows a current user to acquire access authorization and, a central module (M4) for the partial or total revocation of access authorization previously granted.

7. The protected application launcher as set forth in claim 3, characterized in that the privilege acquisition means (MODPRIV) comprises:

a delegation definition module (M1) for the presentation of various privileged users and for initiation of a dialogue which allows the current user to acquire access authorization and, a central module (M4) for the partial or total revocation of access authorization previously granted.

8. The protected application launcher as set forth in claim 5, characterized in that the privilege acquisition means (MODPRIV) comprises:

a delegation definition module (M1) for the presentation of various privileged users and for initiation of a dialogue which allows the current user to acquire access authorization and, a central module (M4) for the partial or total revocation of access authorization previously granted.

9. The application launcher according to claim 1, characterized in that, the graphical interface (OGI) comprise a display screen (SCR), a software program (PRES) for presenting applications connected by an appropriate link to a mouse (S) acting on the display screen by means of a pointer, and a programmed keyboard (CL), and further comprises means for classifying applications, including:

a) first means for allowing a current user to navigate through a plurality of cascaded windows which appear on the display screen (SCR) of the graphical interface (OGI), and b) second means which enable all applications to be represented in one window as a single tree, making it possible to access an application directly by clicking once on the mouse (S).

10. The application launcher according to claim 3, characterized in that, the graphical interface (OGI) comprise a display screen (SCR), a software program (PRES) for presenting applications connected by an appropriate link to a mouse (S) acting on the display screen by means of a pointer, and a programmed keyboard (CL), and further comprises means for classifying applications, including:

a) first means for allowing the current user to navigate through a plurality of cascaded windows which appear on the display screen (SCR) of the graphical interface (OGI), and b) second means which enable all applications to be represented in one window as a single tree, making it possible to access an application directly by clicking once on the mouse (S).

11. The application launcher according to claim 5, characterized in that, the graphical interface (OGI) comprise a display screen (SCR), a software program (PRES) for presenting applications connected by an appropriate link to a mouse (S) acting on the display screen by means of a pointer, and a programmed keyboard (CL), and further comprises means for classifying applications, including:

a) first means for allowing the current user to navigate through a plurality of cascaded windows which appear on the display screen (SCR) of the graphical interface (OGI), and b) second means which enable all applications to be represented in one window as a single tree, making it possible to access an application directly by clicking once on the mouse (S).

* * * * *